United States Patent [19]

Gerow

[11] 4,115,334
[45] Sep. 19, 1978

[54] ANTISTATIC VINYLIDENE CHLORIDE COATING COMPOSITION, AND FILM COATED THEREWITH

[75] Inventor: Clare William Gerow, Richmond, Va.

[73] Assignee: E. I. Du Pont de Nemours and Company, Wilmington, Del.

[21] Appl. No.: 799,123

[22] Filed: May 20, 1977

Related U.S. Application Data

[63] Continuation-in-part of Ser. No. 714,268, Aug. 13, 1976, abandoned.

[51] Int. Cl.$^2$ .......................... C08K 3/22; C08K 3/30
[52] U.S. Cl. ........................ 260/28.5 D; 260/31.6; 260/DIG. 16; 260/853; 260/873; 428/348; 428/484; 428/485; 428/518; 428/508; 428/520; 428/523; 428/922; 526/2; 526/3; 526/343
[58] Field of Search ............... 260/DIG. 16, 28.5 D, 260/23 XA, 31.6, 30.4 R, 45.7 PH, 45.7 S, 853, 873; 428/348, 484, 485, 922, 518, 508, 520, 523; 526/2, 3, 343

[56] References Cited

U.S. PATENT DOCUMENTS

| | | | |
|---|---|---|---|
| 2,136,348 | 11/1938 | Wiley | 526/343 |
| 2,802,801 | 8/1957 | Reid et al. | 260/30.4 R |
| 2,922,773 | 1/1960 | Coler et al. | 260/30.4 R |
| 3,341,343 | 9/1967 | Beiswanger et al. | 106/177 |
| 3,397,163 | 8/1968 | Bruno et al. | 260/28.5 D |
| 3,442,836 | 5/1969 | Barry | 260/28.5 D |
| 3,639,324 | 2/1972 | Owens | 260/28.5 D |
| 3,666,832 | 5/1972 | Bump et al. | 260/853 |
| 3,764,376 | 9/1973 | Wagner et al. | 260/23 H |
| 3,853,588 | 12/1974 | Haskell et al. | 117/46 FC |
| 3,896,066 | 7/1975 | Ranck | 260/28.5 AV |

*Primary Examiner*—V. P. Hoke

[57] ABSTRACT

A vinylidene chloride copolymer coating composition containing small amounts of a polybasic acid of phosphorus, such as orthophosphoric acid, or sulfuric acid, in combination with a mono- or diglyceride. Organic polymeric films, such as polyester and regenerated cellulose films, coated therewith exhibit excellent antistatic properties. Such coated films can be run on various types of machinery without problems due to static build-up.

56 Claims, No Drawings

ANTISTATIC VINYLIDENE CHLORIDE COATING COMPOSITION, AND FILM COATED THEREWITH

This is a continuation-in-part of application Ser. No. 714,268, filed Aug. 13, 1976, now abandoned.

BACKGROUND OF THE INVENTION

The invention concerns improvements in and relating to the antistatic properties of coating compositions of vinylidene chloride copolymers used as coatings on organic polymeric films.

It is well known in the art to apply coating compositions of the above-specified type to various base films so as to achieve combinations of properties not possessed by either the base film or coating alone. Thin films, however, are prone to develop static charges which cause the films to stick and jam in machinery used for packaging and laminating operations. In order to meet such problems, it is known to add to coating compositions small amounts of substances which confer antistatic properties, or to aftersize coated films with similar materials.

For example, U.S. Pat. No. 3,677,811 discloses the incorporation of an antistatic composition comprising a mixture of a compound such as bis(2-hydroxyethyl) myristyl amine or bis(2-hydroxyethyl) tallow amine and one or more glycerides into a coating of a heat sealable polymer that is applied to a base film.

Nevertheless, static problems remain in many instances. To cite but a single example, solvent coating of polyester films with vinylidene chloride copolymer (sometimes referred to as saran) coating compositions results in films having a very high static propensity. Although antistats have been added to the coating composition, they are either not sufficiently effective to eliminate static build-up, or they adversely effect other properties such as the heat seal strength, especially at high humidities. Saran-coated film can be aftersized to lower the static propensity, but this has the disadvantages that the expense of an extra coating operation is required, and if too much aftersize is used, the heat seal strength is lowered to an unacceptable level. Also, in the case of aftersizing a coated polyester film, the film tensions required in the drying section of the coater result in increased film shrinkage upon subsequent reheating.

SUMMARY OF THE INVENTION

It has now been found that when a polybasic acid of phosphorus, or sulfuric acid, is used in combination with one or more mono- or diglycerides in a saran coating composition, a film having excellent antistatic properties is obtained. More specifically, according to the present invention, there is provided a coating composition comprising
(a) a copolymer of vinylidene chloride and at least one other ethylenically unsaturated monomer copolymerizable therewith, said copolymer containing at least 80% by weight of vinylidene chloride,
(b) about 0.5 to 5% by weight, based on said vinylidene chloride copolymer, of a mono- or diglyceride,
(c) about 0.5 to 5% by weight, based on said vinylidene chloride copolymer, of sulfuric acid or a polybasic acid of phosphorus, or mixtures thereof, and
(d) an antisticking agent.

Additionally, it has been found that about 0.1 to 5% by weight based on said vinylidene chloride copolymer, of a partial organic ester of phosphoric acid can be added to the coating composition to extend the existence of the excellent antistatic properties realized by use of the composition.

According to other aspects of the invention, there are also provided films having a coating of the above composition on at least one side thereof, and coating baths of the coating composition in a volatile organic solvent.

The improved coating composition of the invention provides coated films which have a very low static propensity. The need to aftersize the coated film is eliminated, and the coated films have good dimensional stability.

Surprisingly, when orthophosphoric acid is used in the coating composition, improved heat-sealing performance is also observed. This improvement is manifest in both extending the attainment of good heat-seals to lower sealing temperatures, and improving the heat seal strength at the ordinary sealing temperatures. Improved release from crimped sealing jaws is also observed.

Accordingly, use of a polybasic acid of phosphorus is preferred, and orthophosphoric acid is highly preferred. To meet a desire or requirement for the presence of antistatic properties over a period of more than six months, the combined use of phosphoric acid and partial organic esters of phosphoric acid is preferred.

In the case of sulfuric acid, in some instances the antistatic properties have been observed to develop more quickly than in the case of orthophosphoric acid. Also, improved heat seal values at low sealing temperatures have been observed in some cases but not in others, while some sacrifice in heat seal values at ordinary sealing temperature is seen.

DESCRIPTION OF THE PREFERRED EMBODIMENTS

Copolymers of vinylidene chloride and at least one other ethylenically unsaturated monomer are well known in the art for use in saran coating compositions. Representative monomers useful in preparing these vinylidene chloride copolymers include: acrylic acid; acrylates such as methyl, ethyl, isobutyl, butyl, and 2-ethyl hexyl acrylates; methacrylates such as methyl, phenyl, cyclohexyl, methoxyethyl and chloroethyl methacrylate; methyl alpha-chloroacrylate; methyl isopropenyl ketone; acrylonitrile; methacrylonitrile; methyl vinyl ketone; vinyl chloride; vinyl acetate; vinyl propionate; vinyl chloroacetate; vinyl bromide; styrene; vinyl naphthalene; ethyl vinyl ether; N-vinyl phthalimide; N-vinyl succinimide; N-vinyl carbazole; acrylamide; methacrylamide; phenyl vinyl ketone; diethyl fumarate; methacrylic acid; itaconic acid; dimethyl itaconate; and the like. The most useful monomers fall within the general formula

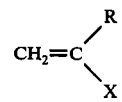

where R is hydrogen, halogen, or a saturated aliphatic radical, and X is one of —Cl, —Br, —F, —CN, —C$_6$H$_5$, —COOH,

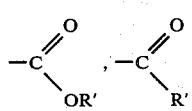

—CH=O, —OC$_6$H$_5$, —CONH$_2$, —CONH—R' and —CONR'$_2$ where R' is alkyl.

Copolymers of vinylidene chloride with an ethylenically unsaturated monomer are generally described in terms of the weight ratio of the monomer units in the copolymer. For purposes of this invention, the vinylidene chloride content should be at least 80% to obtain a tack-free coating, and preferably at least 88% for optimum barrier properties. By "barrier properties" is meant that the copolymer is relatively impermeable to water vapor. In general, the vinylidene chloride content should not exceed about 94% as copolymers of higher vinylidene chloride content have poorer heat sealability, although they have excellent barrier and tack-free properties. Useful copolymers generally have an intrinsic viscosity of at least 1.3 as measured on a 1% concentration of copolymer in tetrahydrofuran at 25° C.

Although a single vinylidene chloride copolymer is generally used, in some cases it is advantageous to use a mixture of two or more such copolymers.

The coating composition contains one or more mono- and diglycerides. Such compounds are mono- and diesters of glycerine with fatty acids. The longer chain acids having up to 22 carbons or more are most useful. Especially preferred are glyceryl monostearate, glyceryl monopalmitate and glyceryl monolaurate. Mixtures of them can be used. The glyceride is used in an amount of about 0.5 to 5% by weight, preferably 0.5 to 3% by weight, based on the vinylidene chloride copolymer. While more than 5% could be used, no advantage is seen in this.

The coating composition also contains a polybasic acid of phosphorus, or sulfuric acid. Examples of polybasic acids of phosphorus include orthophosphoric acid, pyrophosphoric acid, polyphosphoric acid, and phosphorous acid. Orthophosphoric acid is most preferred. This constituent is used in an amount of about 0.5 to 5% by weight, based on the amount of vinylidene chloride copolymer. Preferably, the amount is 1 to 3% by weight. While more than 5% could be used, no advantage is seen in this. Mixtures of the acids can also be used.

The coating composition can contain one or more partial organic esters of phosphoric acid. The partial organic esters of phosphoric acid useful herein can be structurally represented by the formula

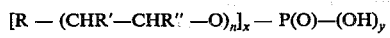

wherein R is the residue of an alkylated phenol having 1 to 36 carbon atoms in the alkyl group or an alkyl hydroxy having 6 to 27 carbon atoms in the alkyl group; R' and R" are H or methyl; $n$ is 1 to 150; $x$ is 1 to 2; $y$ is 1 to 2; and $x + y$ is 3. Such compounds can be generally characterized as phosphate esters of nonionic surfactants. Examples of such esters having an alkyl hydroxy residue include: lauryl hydroxypoly(oxyethylene) dihydrogen phosphate, lauryl hydroxypoly(oxyethylene) monohydrogen phosphate, and mixtures thereof; and the corresponding hexyl, stearyl, docosyl, heptacosyl, and the like, phosphates. Above-mentioned lauryl esters are preferred such that, in the formula, R is 12 carbon atoms, R' and R" are hydrogen, $n$ is 4 to 4.5, $x$ is either 1 or 2, and $y$ is, respectively, either 2 or 1. A mixture of the lauryl esters is usually used. Examples of such esters having an alkylated phenol residue include nonylphenylpoly(oxyethylene)di- and monohydrogen phosphate and corresponding cresyl, docosyl, dioctadecyl, and the like, phosphates. The ester is used in an amount of about 0.1 to 5% by weight, preferably 0.3 to 2% by weight, based on the vinylidene chloride copolymer. While more than 5% could be used, no advantage is seen in this.

In making up the coating baths for applying the coating compositions, when orthophosphoric acid is used, the commercially available concentrated, or 86%, acid has been used. In the case of sulfuric acid, concentrated, or 98%, acid has been used. Although the acid component has been added as the final ingredient in preparing the coating bath, no reason is seen why it could not be added before addition of other components.

While the use of mono- and diglycerides in coating compositions to achieve antistatic properties is known, the present invention provides substantial improvement in antistatic properties over that provided by the glycerides. The combination of the glyceride and acid is more effective than the use of either constituent alone. When glyceryl monolaurate is used, less orthophosphoric acid is required to achieve the same general level of antistatic properties than when glyceryl monostearate is used.

Also, the use of above-described partial organic esters of phosphoric acid is known to achieve antistatic properties. Those antistatic properties are short-lived, however, when compared with the duration of antistatic properties achieved by the combination of the partial organic esters of phosphoric acid as one component and the mixture of phosphoric or sulfuric acid and glycerides as another component. The duration of antistatic properties exhibited by the combination of components is greater than the duration of such properties exhibited by either component taken alone.

The composition also contains an antisticking agent. By this term is meant those materials well known in the art which provide antiblocking characteristics and improved surface properties with respect to release from crimped and smooth sealing jaws and other hot surfaces. These include a wide variety of synthetic and natural waxes, both paraffin and ester types, behenic acid, stearamide, etc., and particulates, such as talc, clays, alumino silicates, silica, insoluble polymers, and the like. Ordinarily these are all used in small amounts, although in some kinds of film the total of them can be as much as 10% by weight, based on the vinylidene chloride copolymer. A combination of 2.7 to 3.3% by weight behenic acid, 0.4 to 0.6% by weight carnauba wax, 1.2 to 1.8% by weight candelilla wax, and 0.5 to 1.0% by weight of stearamide has been found to be especially good. Regenerated cellulose films having a saran coating containing such additives along with glyceryl monostearate have been described in U.S. Ser. No. 688,477, filed on May 20, 1976, by Kane, that and the present applications having a common assignee.

In order to achieve good adhesive bonding between the coating composition and the base film, especially when the latter is a polyester film, it is preferred to include in the coating composition about 0.1 to 6%, and preferably 0.2 to 2%, by weight, based on the vinylidene chloride copolymer, of a linear polyester resin prepared by condensing a glycol and a polyfunctional acid, at least 70% by weight of said polyfunctional acid being an aromatic polyfunctional acid. The improved adhesive bonding is achieved without unduly affecting recognized properties of the vinylidene chloride coating such as low water vapor permeability and good heat sealability.

Linear polyester resins, which can contain up to 30% by weight of an aliphatic polyfunctional acid, are well known in the art and are generally prepared by condensing the selected acid(s) with a diol of the formula $$HOCH_2-CH_2-_xCH_2OH$$

where $x$ is 0 to 10. Particularly useful diols include ethylene glycol and propane-1,3-diol.

Generally both the aromatic acid and aliphatic acid, if present, will be diacids to produce a linear polyester. Thus, the aromatic acid is generally at least one of naphthalene dicarboxylic acid, isophthalic acid, or terephthalic acid. The aliphatic diacid, if present, is generally an acyclic dicarboxylic acid of the formula $$HOOC-CH_2-X-CH_2-COOH,$$

where X is a chain of 2 to 8 carbon atoms, such as adipic acid, sebacic acid, succinic acid, or azelaic acid.

Useful linear polyester resins are capable of forming films and thus have a molecular weight greater than about 500. The molecular weight must be low enough, however, that the polyester resin is soluble in the solvent medium selected for the coating composition. Polyester resins within this molecular weight range have no plasticizing effect on the vinylidene chloride copolymer as evidenced by similar heat seal temperature obtained irrespective of the presence of the polyester.

Linear copolyesters disclosed in U.S. Pat. No. 2,892,747 to John Dye have proven to be particularly useful for this purpose. These copolyesters are transesterification products of the lower alkyl esters of terephthalic acid, isophthalic acid, and at least two acyclic dicarboxylic acids such as adipic acid, azelaic acid, and sebacic acid. A commercially available polyester which can be used is "Vitel" PE 100 sold by Goodyear Chemical Company.

For some purposes, coated films which are not heat sealable or only poorly sealable are satisfactory, and in some cases even desirable, as they have excellent antiblocking properties. For example, films which will become one component of a laminar structure (along with other films such as coated heat sealable films, polyethylene, polypropylene, and the like, the laminate being made by adhesive lamination, by extrusion coating, or by heat and pressure lamination) need not be heat sealable, but they nevertheless should have good antistatic properties to avoid problems caused by static in the laminating apparatus. Such coated films can be made by adding to the coating composition a component which degrades or destroys the heat sealing properties. Resin-like materials capable of crosslinking are suitable for this purpose. Crosslinkable components such as alkyd resins and/or amino resins which are condensation products of an amine, as for example melamine, diazine, urea, cyclic ethylene urea, cyclic propylene urea, thiourea, cyclic ethylene thiourea, alkylmelamines, aryl melamines, benzoquanamines, guanamines, alkyl guanamines, and aryl guanamines with an aldehyde as for example formaldehyde, or alkoxylized compounds such as hexamethyoxymelamine, are suitable. The condensation product of melamine with formaldehyde is especially useful. Such material can be used in an amount of 0.1 to 20% by weight, based on the vinylidene chloride copolymer.

Coating baths of the above described coating compositions are prepared by dissolving the vinylidene chloride copolymer in a volatile organic solvent such as tetrahydrofuran, toluene, methyl ethyl ketone, or mixtures thereof. Conveniently, the glyceride, linear polyester, waxes, partial ester of phosphoric acid, crosslinkable resin; etc., are added to the vinylidene chloride bath, preferably after having been dissolved in the same solvent as is present in the coating bath. The inorganic acid can be added at any time, but is generally added after all the other components have been dissolved or added. The coating composition is applied to one or more surfaces of the selected substrate using conventional apparatus such as a gravure roll or doctor roll, followed by drying to remove the solvent.

The above described coating compositions can be coated onto a variety of base films and surfaces, in particular, films of organic polymers. Especially useful are those where the base film surface is regenerated cellulose, polyester, polyamide, polyacrylates and methacrylate, polyepoxide, polyvinyl chloride, polyvinylidene chloride, polyacrylonitrile, and polyolefins such as polyethylene and polypropylene. The antistatic composition of this invention is useful and effective when applied to any film or surface which exhibits static buildup in the absence of the composition. Representative polyester substrates include polycarbonates such as those prepared from bisphenol A; and 2,6-naphthalate polyesters. Preferred substrates include polyethylene phthalates, such as polyalkylene terephthalate polyesters prepared by reacting terephthalic acid (or a dialkyl ester thereof) with glycols of the series HO—CH$_2$—$_n$OH where $n$ is an integer greater than 1 but not exceeding 10. Suitable glycols include ethylene glycol, trimethylene, glycol, hexamethylene glycol and the like. Other functional compounds which can be reacted with terephthalic acid or with a dialkyl ester of terephthalic acid to produce linear polyester types, include p-xylene glycol, hydroquinone, and cyclic glycols. Other polymers which can be used include polyalkylene terephthalate-containing modifiers such as dibasic acids including among others, isophthalic acid, sebacic acid, adipic acid, sulfonated derivatives and the like. In a preferred embodiment, the coating composition is applied to a polyethylene terephthalate film which has been oriented by stretching in both the machine and transverse directions.

The base films may be primed or subcoated, as is known in the art, with various materials such as acrylics. Crosslinked acrylics such as described in German Offenlegungsschrift P 25 13 423, can also be used as a subcoat. The base film may also be a laminate or coextruded dual-layer polyester film.

The base film may range in thickness from several mils to a small fraction of a mil. Most often, the thickness will range from about 1 mil to about half a mil.

The amount of coating applied will ordinarily be up to 5 g./m.$^2$, and most often be in the range of 2.5 to 3.5 g./m.$^2$, in which range good barrier properties are attained. When barrier properties are not required, adequate antistatic properties can be attained at coating weights as low as 0.1 g./m.$^2$. Difficulty is encountered in achieving uniformity of coating at coating weights below 0.1 g./m.$^2$.

The films of this invention possess properties which make them admirably suited for use as packaging materials for foods such as fresh produce, meats, and baked goods, for household products such as sponges and the like, and for industrial uses such as photographic microfilm base and engineering reproduction materials.

In the examples that follow, film properties are assessed by tests described in the following paragraphs.

Water vapor transmission rate (WVTR) is measured according to ASTM Method E-96, Procedure E, and is expressed in grams of water transmitted per 100 square inches per 24 hours.

Heat seal strength is measured as follows. A piece of the coated film is folded in half, and parallel strips 1-inch wide are cut perpendicular to the fold line. Each folded strip is sealed between sealing bars ¾ inch wide, the top bar being metal coated with polytetrafluoroethylene and heated, the bottom bar being rubber and unheated, at a pressure of 5 psi and a dwell time of ¼ second. The temperature of the upper bar is varied to test the seal strength at various temperatures. The resulting strips (usually four samples for each film) are tested by opening each set at the free end, placing them in a Suter testing machine, and pulling them apart. The highest force in grams required to pull the strips apart is taken as a measure of the heat seal bond strength. Heat seals can be measured on the coated film as is, and/or after conditioning for 3 days at 35% or 81% relative humidity (RH), the latter test being a more severe test of the quality of the film coating.

Surface resistivity, which is a measure of antistatic properties, is measured by ASTM method D-257-66. Better antistatic properties correlate with lower surface resistivity. Surface resistivity of $10^{13}$ corresponds to poor antistatic properties, while surface resistivities of $10^6$ to $10^8$ represent excellent antistatic properties.

EXAMPLES 1–17

A coating bath of a saran copolymer (either saran A, which is 91/4/5/0.3 parts by weight vinylidene chloride/acrylonitrile/methyl methacrylate/itaconic acid, or saran B, which is 90/7/3/0.3 parts by weight vinylidene chloride/methacrylonitrile/methyl methacrylate/itaconic acid) was prepared as follows.

Tetrahydrofuran (500 cc) was placed in a flask at 40° C., and 1 gram of polyester resin ("Vitel" PE 100) was placed in the flask and dissolved upon stirring for 30 minutes. Toluene (333 cc) was added, followed by all of the solids. In all of the examples and controls, the solids include:

200 g. saran resin
2 g. talc
1 g. carnauba wax
3 g. candelilla wax
1 g. stearamide ("Armid" 18)
6 g. behenic acid ("Hystrene" 7022)

An amount of a glyceryl monoester indicated in Table I was also added with the other solids. An additional 240 cc of tetrahydrofuran was added. The composition was stirred for an hour and then 86% orthophosphoric acid in an amount indicated in Table I was added.

The coating bath was applied to both sides of an 0.48 mil (12 microns) oriented heat set polyethylene terephthalate film on an 11 inch (28 cm.) wide doctor roll coater at a speed of 90 feet per minute (27 m./min.) and the solvent was removed in a tower at 120° C.

The test results for the coated films are shown in Table I. It can be seen that the films of the invention exhibit significant improvement in heat seal strength, in having consistently good heat seals at the lower sealing temperature, and in lower surface resistivities.

TABLE I

| Example | Saran Polymer | Phosphoric Acid (PHR)* | Ester** (PHR) | Coating Weight g./m.² | Surface Resistivity+ (ohms/sq.), RH | Seal Strength++ 100° C. N/m | Seal Strength++ 140° C. N/m |
|---|---|---|---|---|---|---|---|
| 1 | A | 0.5 | GML, 3 | 5.0 | 4 (10), 25% | 56 | 149 |
| 2 | A | 1 | GML, 3 | 4.8 | 1 (11), 25% | 60 | 147 |
| 3 | B | 1 | GML, 3 | 4.0 | 2 (8), 25% | 62 | 147 |
| 4 | B | 2 | GML, 3 | 3.5 | 1.4 (8), 25% | 62 | 162 |
| 5 | B | 1 | GML, 3 | 3.1 | 1.3 (8), 25% | 85 | 154 |
| 6 | B | 0.5 | GMS, 3 | 2.9 | >1 (13), 35% | 124 | 145 |
| 7 | B | 1 | GMS, 3 | 2.8 | 2.5 (10), 35% | 97 | 149 |
| 8 | B | 1.5 | GMS, 3 | 3.5 | 7 (7), 35% | 95 | 147 |
| 9 | B | 2 | GMS, 3 | 3.0 | 6 (7), 35% | 79 | 145 |
| 10 | A | 2 | GMS, 3 | 3.2 | 1 (8), 35% | 69 | 168 |
| 11 | A | 3 | GMS, 3 | 2.8 | 3 (7), 35% | 79 | 170 |
| 12 | A | 4 | GMS, 3 | 3.6 | 1.3 (7), 35% | 42 | 166 |
| 13 | A | 5 | GMS, 3 | 3.6 | 6 (6), 35% | 54 | 174 |
| 14 | B | 1.5 | GMS, 0.3 | 3.2 | 7 (11), 35% | 120 | 147 |
| 15 | B | 1.5 | GMS, 1 | 2.7 | 1 (13), 35% | 114 | 143 |
| 16 | B | 1.5 | GMS, 2 | 3.8 | 3 (9), 35% | 118 | 153 |
| 17 | B | 1.5 | GMS, 3 | 3.4 | 2 (9), 35% | 104 | 158 |
| Control A | A | 0 | GML, 3 | 3.6 | >1 (13), 25% | 7.7 | 127 |
| Control B | B | 0 | GML, 3 | 4.0 | 2 (12), 25% | 35 | 100 |
| Control C | B | 0 | GMS, 3 | 2.8 | 6 (11), 35% | 10 | 131 |
| Control D | A | 0 | GMS, 3 | 3.2 | 1.1 (12), 35% | 83 | 85 |
| Control E | B | 1.5 | 0 | 3.0 | 4 (11), 35% | 77 | 131 |

*PHR - parts per hundred of saran.
**GML - glyceryl monolaurate; GMS - glyceryl monostearate.
+RH - relative humidity; 4 (10) means $4 \times 10^{10}$.
++Newtons per meter of seal.

EXAMPLE 18

A coating composition was prepared by dissolving 1 gram of polyester ("Vitel" PE 100) in 100 ml. of tetrahydrofuran. This was combined with a bath containing 273 ml. of toluene, 640 ml. of tetrahydrofuran and 200 grams of saran A. To this was added 60 ml. of toluene with 1 g. carnauba wax, 3 g. candelilla wax, 1 g. "Armid" 18, 6 g. glyceryl monostearate, 6 g. behenic acid and 2 g. talc. Finally 3 g. of concentrated sulfuric acid was added.

The film was coated as described in Examples 1–17. The coating weight was 3.3 g./m.². The surface resistivity was 2.5 (6).

EXAMPLE 19

The coating formulation of Example 18 was repeated with 1.5 g. of sulfuric acid. The surface resistivity of coated film was 1.3 (8) and the WVTR 0.33.

EXAMPLE 20

The formulation of Example 18 was repeated with saran B and 3 g. sulfuric acid. The initial surface resistivity was 1.3 (7). After 24 hours at 35% RH the surface resistivity was 1.3 (9), and the WVTR was 0.39.

EXAMPLES 21-24

A comparison is shown between orthophosphoric and sulfuric acid formulations applied to polyester film in Table II. The coating compositions are otherwise as given in Example 18, with the exception that the saran is either A or B as identified in Table II. The heat seal strength of the phosphoric acid formulations are better than for sulfuric acid.

and good heat seals when a mixture of sulfuric and orthophosphoric acids is used.

EXAMPLE 28

Examples 20-24, above, indicate that the surface resistivity of coated films tends to increase with passage of time. The following example is provided as a showing of the long-lived antistatic character of a combination of partial organic esters of phosphoric acid and a mixture of inorganic acid with glycerides.

Coating baths were prepared as described in Examples 1-17 using saran B and 6 grams of glyceryl monostearate. Orthophosphoric acid and a mixture of lauryl hydroxypoly(oxyethylene)mono- and dihydrogen phosphates were added in amounts indicated in Table IV to yield five different coating compositions. The lauryl phosphate ester, used in this example, can be characterized as a mixture of alpha-dodecyl-omega-hydroxypoly(oxyethylene)dihydrogen phosphate and monohydrogen phosphate esters having an acid number of

TABLE II

| Example | Saran Polymer | Acid | Coating Weight g./m.$^2$ | Resistivity** (35% RH) Initial | 3 Days | Seal Strength 110° C. N/m |
|---|---|---|---|---|---|---|
| 21 | A | P* | 3.1 | 5 (7) | 3.5 (10) | 113 |
| 22 | A | S | 3.2 | 1.5 (6) | 1.6 (10) | 29 |
| 23 | B | P | 3.2 | 8 (6) | 3.5 (10) | 124 |
| 24 | B | S | 3.2 | 1.5 (6) | 2.8 (10) | 94 |
| Control F | A | none | 3.2 | 2 (13) | 2.5 (12) | 110 |

*P - 3 g. orthophosphoric acid; S-3 g. sulfuric acid
**5 (7) means 5 × 10$^7$ ohms/square

EXAMPLES 25-27

Additional coating baths and coated films were prepared as in Examples 1-17, having the compositions indicated in Table III. Heat seal and surface resistivity data for the coated film is also given in Table III.

103-111 and produced by the esterification of the condensation product of 1 mole of n-dodecyl alcohol with 4-4.5 moles of ethylene oxide.

The coating compositions were applied to 0.48 mil (12 micron) oriented heat set polyethylene terephthalate film in the manner described above in Examples

TABLE III

|  | Example 25 | Example 26 | Control G | Example 27 |
|---|---|---|---|---|
| Saran B | 200 g. | 200 g. | 200 g. | 200 g. |
| polyester ("Vitel" PE 100) | 1 | 1 | 1 | 1 |
| talc | 2 | 2 | 2 | 2 |
| carnauba wax | 1 |  |  | 1 |
| candelilla wax | 3 |  |  | 3 |
| stearamide ("Armid" 18) | 1 |  |  | 1 |
| behenic acid ("Hystrene" 7022) | 6 |  |  | 6 |
| glyceryl monostearate | 6 | 6 |  | 6 |
| orthophosphoric acid | 4 | 4 | 4 | 2 |
| sulfuric acid |  |  |  | 2 |
| Surface resistivity | 1.6 (7)* | 6 (8) | 4 (12) | 1.5 (6) |
| Heat seal, 100° C., N/m | 69 | 99 | 81 | 75 |
| 140° C., N/m | 167 | 155 | 66 | 156 |

*1.6 (7) means 1.6 × 10$^7$ ohms/square

Comparison of Example 26 with Example 25 shows that it is the glyceride and inorganic acid which are responsible for the improved heat seals and low surface resistivity. Comparison of Examples 26 and Control G shows that the improved properties are not obtained with the inorganic acid alone. Example 27 shows a highly satisfactory result of very low surface resistivity 1-17. The test results for the coated films are shown in Table IV. It can be seen that the film bearing the combination of the phosphoric acid ester as one component and phosphoric acid as another component exhibit antistatic properties of longer duration than films bearing either of those components taken above.

TABLE IV

| Sample Number | Phosphoric Acid (PHR)* | Partial Organic ester of Phosphoric acid (PHR) | SURFACE RESISTIVITY (ohms/sq at 35% RH after t days) | | | | Seal Strength 100° C. N/m | Coating Weight (g/m$^2$) |
|---|---|---|---|---|---|---|---|---|
|  |  |  | t = 0 | t = 3 | t = 10 | t = 300 |  |  |
| 1 | 3 | 2 | 2.5(10)** | 5(7) | 5(8) | 6.3(9) | 106 | 4.2 |
| 2 | 2 | 2 | 4(8) | 3.3(9) | 6(9) | 2.2(10) | 143 | 4.4 |
| 3 | 1 | 1 | 7(7) | 3.3(10) | 3(10) | 1 (14) | 156 | 4.4 |
| 4 | 3 | 0 | 2.5(10) | 1.6(12) | 2(11) | 1 (15) | 117 | 3.0 |

TABLE IV-continued

| Sample Number | Phosphoric Acid (PHR)* | Partial Organic ester of Phosphoric acid (PHR) | SURFACE RESISTIVITY (ohms/sq at 35% RH after t days) | | | | Seal Strength 100° C. N/m | Coating Weight (g/m²) |
| --- | --- | --- | --- | --- | --- | --- | --- | --- |
| | | | t = 0 | t = 3 | t = 10 | t = 300 | | |
| 5 | 0 | 2 | 3(11) | 8(11) | 1.2(11) | 2.2(12) | 18 | 4.3 |

*PHR - parts per hundred of saran
**2.5(10) means 2.5 × 10¹⁰

EXAMPLE 29

Samples of film prepared as in Example 8 were tested on packaging machinery. In a test on a Campbell Wrapper using a crimp jaw sealer the coated film had excellent antistatic properties and better than those of a coated film sold commercially for the same end uses, but not containing the antistatic agents of the invention. The seal strength was retaining even after exposure for 3 days at 29° C. and 80% RH showing good high humidity performance. Similar results were obtained on a Mira Pak packaging machine.

I claim:

1. A coating composition comprising
   (a) a copolymer of vinylidene chloride and at least one other ethylenically unsaturated monomer copolymerizable therewith, said copolymer containing at least 80% by weight of vinylidene chloride,
   (b) about 0.5 to 5% by weight, based on said vinylidene chloride copolymer, of a fatty acid mono- or diglyceride,
   (c) about 0.5 to 5% by weight, based on said vinylidene choloride copolymer, of sulfuric acid or a polybasic acid of phosphorus, or mixtures thereof, and
   (d) an antisticking agent.

2. The composition of claim 1, further comprising
   (e) about 0.1 to 6% by weight, based on said vinylidene chloride copolymer, of a linear film-forming polyester resin having a molecular weight of at least 500 prepared by condensing a glycol and a polyfunctional acid, at least 7% by weight of said polyfunctional acid being an aromatic polyfunctional acid.

3. The composition of claim 2, wherein component (c) is a polybasic acid of phosphorus.

4. The composition of claim 2, wherein component (c) is orthophosphoric acid, pyrophosphoric acid, or phosphorous acid.

5. The composition of claim 2, wherein component (c) is orthophosphoric acid.

6. The composition of claim 2, wherein component (c) is sulfuric acid.

7. The composition of claim 5, wherein component (d) comprises wax and particulate.

8. The composition of claim 5, wherein component (d) consists of 2.7 to 3.3% by weight of behenic acid, 0.4 to 0.6% by weight of carnauba wax, 1.2 to 1.8% by weight of candelilla wax, and 0.5 to 1.0% by weight of stearamide, all based on said vinylidene chloride copolymer.

9. The composition of claim 8, wherein component (c) is orthophosphoric acid in an amount of about 1 to 3% by weight, based on said vinylidene chloride copolymer.

10. The composition of claim 9, wherein component (b) is present in an amount of about 0.5 to 3% by weight, based on said vinylidene chloride copolymer.

11. The composition of claim 10, wherein component (a) is at least one copolymer of vinylidene chloride, each copolymer being a copolymer of vinylidene chloride and at least one monomer of the formula

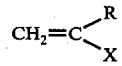

where R is hydrogen, halogen, or a saturated aliphatic radical, and X is chlorine, bromine, fluorine, —CN, —C₆H₅, —COOH, —HC=O, —OC₆H₅, —CONH₂, —CONHR', —CONR'₂,

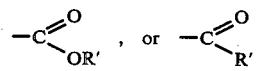

where R' is alkyl, said copolymer containing about 88 to 94% by weight of vinylidene chloride.

12. The composition of claim 11, wherein component (e) is the condensation product of
   (i) at least one diol of the formula HOCH₂—CH₂—ₓ-CH₂OH
      where x is 0 to 10, and
   (ii) at least one diacid, wherein at least 70% by weight of said diacid is an aromatic diacid and up to 30% by weight of said diacid is an acyclic dicarboxylic acid of the formula HOOC—CH₂—X—CH₂—COOH
      where X is a chain of 2 to 8 carbon atoms.

13. The composition of claim 12, wherein the diol is ethylene glycol, the aromatic diacid is at least one of isophthalic acid and terephthalic acid, and the acyclic dicarboxylic acid, if present, is at least one of adipic acid, sebacic acid, succinic acid, or azelaic acid.

14. The composition of claim 13, wherein component (e) is present in an amount of about 0.2 to 1% by weight, based on said vinylidene chloride copolymer.

15. The composition of claim 14, wherein component (b) is glyceryl monostearate, glyceryl monopolmitate, glyceryl monolaurate, or mixtures thereof.

16. The composition of claim 2, wherein component (d) is a particulate, and further comprising
   (f) at least one resinlike component capable of crosslinking the vinylidene chloride copolymer.

17. The composition of claim 5, wherein component (d) is a particulate, and further comprising
   (f) an amino resin in an amount of 0.1 to 20% by weight, based on said vinylidene chloride copolymer.

18. The composition of claim 6, wherein component (d) is a particulate, and further comprising
   (f) an amino resin in an amount of 0.1 to 20% by weight, based on said vinylidene chloride copolymer.

19. The composition of claim 17, wherein the amino resin is a melamine-formaldehyde resin.

20. The composition of claim 19, wherein component (c) is orthophosphoric acid in an amount of about 1 to 3% by weight, and component (b) is present in an amount of about 0.5 to 3% by weight, both based on said vinylidene chloride copolymer.

21. The composition of claim 20, wherein component (a) comprises a copolymer of vinylidene chloride and at least one monomer of the formula

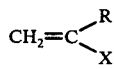

where R is hydrogen, halogen, or a saturated aliphatic radical, and X is chlorine, bromine, fluorine, —CN, —$C_6H_5$, —COOH, —HC=O, —$OC_6H_5$, —$CONH_2$, —CONHR′, —CONR′$_2$,

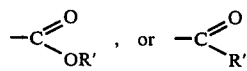

where R′ is alkyl, said copolymer containing about 88 to 94% by weight of vinylidene chloride, and component (e) is the condensation product of
(i) at least one diol of the formula HOCH$_2$—CH$_2$—$_x$—CH$_2$OH
where x is 0 to 10, and
(ii) at least one diacid, wherein at least 70% by weight of said diacid is an aromatic diacid and up to 30% by weight of said diacid is an acyclic dicarboxylic acid of the formula HOOC—CH$_2$—X—CH$_2$—COOH
where X is a chain of 2 to 8 carbon atoms.

22. An organic polymeric base film coated on at least one side thereof with a continuous, adherent coating composition of claim 1.

23. The film of claim 22, wherein the base film is a polyester film.

24. The film of claim 23, wherein the polyester is a polyethylene phthalate.

25. The film of claim 24, wherein the polyester is polyethylene terephthalate.

26. The film of claim 22, wherein the base film is a regenerated cellulose film.

27. An organic polymeric base film coated on at least one side thereof with a continuous, adherent coating composition of claim 5.

28. The film of claim 27, wherein the base film is a polyester film.

29. The film of claim 28, wherein the polyester is a polyethylene phthalate.

30. The film of claim 29, wherein the polyester is polyethylene terephthalate.

31. The film of claim 27, wherein the base film is a regenerated cellulose film.

32. An organic polymeric base film coated on at least one side thereof with a continuous, adherent coating composition of claim 15.

33. The film of claim 32, wherein the base film is a polyester film.

34. The film of claim 33, wherein the polyester is a polyethylene phthalate.

35. The film of claim 34, wherein the polyester is polyethylene terephthalate.

36. The film of claim 32, wherein the base film is a regenerated cellulose film.

37. An organic polymeric base film coated on at least one side thereof with a continuous, adherent coating composition of claim 16.

38. The film of claim 37, wherein the base film is a polyester film.

39. The film of claim 38, wherein the polyester is a polyethylene phthalate.

40. The film of claim 39, wherein the polyester is polyethylene terephthalate.

41. The film of claim 37, wherein the base film is a regenerated cellulose film.

42. An organic polymeric base film coated on at least one side thereof with a continuous, adherent coating composition of claim 21.

43. The film of claim 42, wherein the base film is a polyester film.

44. The film of claim 43, wherein the polyester is a polyethylene phthalate.

45. The film of claim 44, wherein the polyester is polyethylene terephthalate.

46. The film of claim 42, wherein the base film is a regenerated cellulose film.

47. The subcoated organic polymeric base film coated on at least one side thereof with a continous, adherent coating composition of claim 1.

48. The film of claim 47, wherein the base film is subcoated with an acrylic polymer.

49. The film of claim 48, wherein the acrylic polymer is crosslinked.

50. The film of claim 22, wherein the base film is a coextruded polyester film.

51. The composition of claim 1, further comprising
(e) about 0.1 to 5% by weight, based on said vinylidene chloride copolymer of a partial organic ester of phosphoric acid represented by the formula

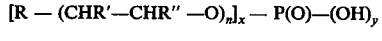

wherein R is the residue of an alkylated phenol having 1 to 36 carbon atoms in the alkyl group or an alkyl hydroxy having 6 to 27 carbon atoms in the alkyl group; R′ and R″ are H or methyl; n is 1 to 150; x is 1 to 2; y is 1 to 2; and x + y is 3.

52. The composition of claim 2, further comprising
(f) about 0.1 to 5% by weight, based on said vinylidene chloride copolymer of a partial organic ester of phosphoric acid represented by the formula

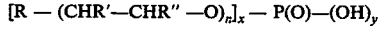

wherein R is the residue of an alkylated phenol having 1 to 36 carbon atoms in the alkyl group or an alkyl hydroxy having 6 to 27 carbon atoms in the alkyl group; R′ and R″ are H or methyl; n is 1 to 150; x is 1 to 2; y is 1 to 2; and x + y is 3.

53. The composition of claim 52 wherein the partial organic ester of phosphoric acid is lauryl hydroxypoly(oxyethylene) hydrogen phosphate.

54. An organic polymeric base film coated on at least one side thereof with a continuous, adherent coating composition of claim 51.

55. An organic polymeric base film coated on at least one side thereof with a continuous, adherent coating composition of claim 52.

56. An organic polymeric base film coated on at least one side thereof, with a continuous, adherent coating composition of claim 53.

* * * * *

UNITED STATES PATENT OFFICE
CERTIFICATE OF CORRECTION

PATENT NO. : 4,115,334

DATED : September 19, 1978

INVENTOR(S) : Clare William Gerow

It is certified that error appears in the above-identified patent and that said Letters Patent are hereby corrected as shown below:

Column 5, line 10 in the formula, after $HOCH_2$ insert -- ( and after second "2" insert -- ) --.

Column 6, lines 36 and 37, delete the formula which is incorrect and insert -- $HO(CH_2)_nOH$ --.

Column 11, line 17, "retaining" should be -- retained --.

Column 11, line 31 in Claim 1, "chloride" should replace "choloride".

Column 11, line 40 (Claim 2) "7%" should be -- 70% --.

Column 12, line 31 (Claim 12), in the formula there should be a parenthesis going through each bond.

Column 13, line 25 (Claim 21) there should be a parenthesis going through each bond.

Signed and Sealed this

Eighth Day of May 1979

[SEAL]

Attest:

RUTH C. MASON
Attesting Officer

DONALD W. BANNER
Commissioner of Patents and Trademarks